Figure 1:
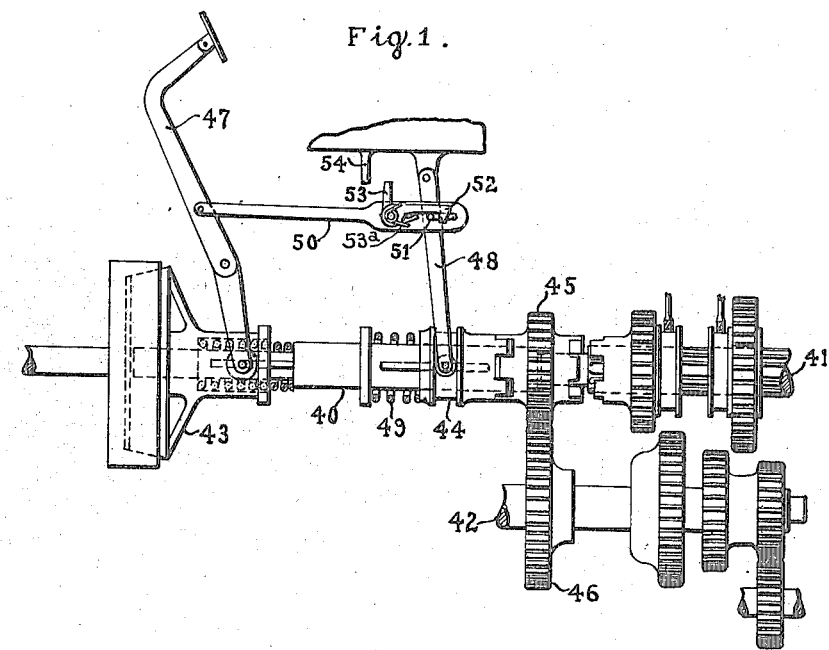

July 1, 1924.

W. C. STEVENS

TRANSMISSION MECHANISM

Filed Nov. 1, 1920

1,499,418

INVENTOR
William C. Stevens.
BY
ATTORNEY

Patented July 1, 1924.

1,499,418

UNITED STATES PATENT OFFICE.

WILLIAM CLIFFORD STEVENS, OF MILWAUKEE, WISCONSIN, ASSIGNOR TO THE CUTLER-HAMMER MFG. CO., OF MILWAUKEE, WISCONSIN, A CORPORATION OF WISCONSIN.

TRANSMISSION MECHANISM.

Application filed November 1, 1920. Serial No. 420,934.

*To all whom it may concern:*

Be it known that I, WILLIAM C. STEVENS, a citizen of the United States, residing at Milwaukee, in the county of Milwaukee and State of Wisconsin, have invented new and useful Improvements in Transmission Mechanisms, of which the following is a full, clear, concise, and exact description, reference being had to the accompanying drawing, forming a part of this specification.

This invention relates to transmission mechanisms and more particularly to variable speed transmissions for automobiles and the like.

Such transmissions generally include a variable speed gear set and a friction clutch for transmitting power thereto. The driven element of the friction clutch is usually permanently connected to the drive shaft of the gear set and in practice it has been found that upon release of such element the same possesses sufficient inertia to cause considerable gear clashing during speed changing operations.

The present invention has among its objects to provide a variable speed transmission mechanism wherein provision is made for disconnecting certain parts of the gear set from the driven member of the friction clutch during speed changing operations.

Another object is to provide means for disconnecting certain parts of the gear set from the driven element of the friction clutch following release of the latter and for reconnecting said parts thereto prior to resetting of said friction clutch.

Another object is to provide a transmission mechanism wherein power is transmitted to the variable speed gearing through a plurality of clutches, one being of a friction type and driving through the other, the latter being of a positive type and being releasable upon release of the former to free the gearing from the driven element of the former during increased or decreased speed changing operations.

Various other objects and advantages will hereinafter appear.

The accompanying drawing illustrates certain embodiments of the invention which will now be described, it being understood that the embodiments illustrated are susceptible of various modifications without departing from the scope of the appended claims.

Figure 2:
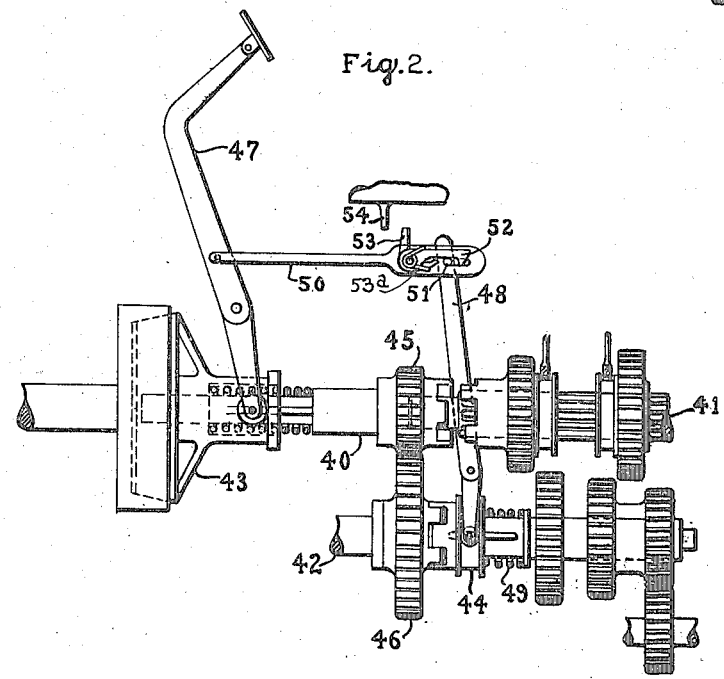

In the drawing,

Fig. 1 is a schematic view of a variable speed transmission mechanism embodying the invention; and, Fig. 2 is a similar view of a modification of the embodiment shown in Fig. 1.

Referring to Fig. 1 the same shows a conventional form of gear set including aligned driving and driven shafts 40 and 41 and a countershaft 42. Power is transmitted to the drive shaft 40 through a friction clutch 43 and said shaft has a jaw clutch member 44 slidably keyed thereto for engaging jaws on a pinion 45 which is rotatable on said shaft. Pinion 45 meshes with a gear 46 fixed to countershaft 42 and as is understood the countershaft drives a plurality of gears to be selectively meshed with cooperating gears slidably keyed to the driven shaft 41 for a plurality of forward speeds and a single reverse speed while pinion 45 and one of the gears on the driven shaft 41 have co-operating jaws constituting a coupling by means of which the drive shaft 40 may be directly connected to the driven shaft 41 to provide another forward speed.

The friction clutch 43 is provided with the usual foot operating pedal 47 while the jaw clutch member 44 is provided with an operating lever 48 for moving the same towards the left against the action of a coil spring 49 for disengagement from pinion 45. Foot pedal 47 has a link 50 connected thereto which is slidable on a pin 51 on lever 48, and said link carries a pivoted latch 52 adapted to engage pin 51 upon depression of the foot pedal 47 to move lever 48 toward the left for disengagement of jaw clutch member 44 from pinion 45. The aforedescribed operating means for the jaw clutch member 44 is so designed that clutch member 44 disengages pinion 45 immediately following release of the driven member of friction clutch 43. Latch 52 is provided with a bell crank tripping lever 53 which is normally in the position shown but is movable in a clockwise direction with respect to latch 52 against the action of a spring 53ª. Upon depression of foot pedal 47 the vertical arm of lever 53 slides over a fixed stop 54 without changing the position of latch 52 but during initial return movement of said pedal said arm engages said stop and moves latch 52 out of engagement with pin 51 to free clutch member 44 for movement into engagement with pinion 45 under the action of spring 49. During continued return movement of pedal 47 tripping lever 53 slides over the fixed stop 54 and latch 52 returns to the position shown during final return movement of said pedal. Thus it is apparent that provision is made for freeing the driven element of friction clutch 43 from the gearing during gear shifting operations. Moreover provision is made for freeing the drive shaft 40 from the gearing during gear shifting operations and for tripping the jaw clutch free from the actuating lever 47 for unrestrained re-engagement of the jaws of the former.

The modification shown in Fig. 2 is similar to that shown in Fig. 1 with the exception that pinion 45 is fixed to drive shaft 40 and jaw clutch member 44 is mounted on the countershaft 42 to releasably connect the gear 46 to the latter. The operating lever 48 is arranged to move the jaw clutch 44 to the right to disengage the same from gear 46 following release of friction clutch 43 and spring 49 is arranged to move the same to the left for re-engagement with said gear. Thus provision is made for disconnecting the driven element of the friction clutch 43, driving shaft 40 and gears 45 and 46 from the countershaft 42 during gear changing operations.

It should be understood that the friction clutch may be of any desired type and any releasable clutch having a driven element of small inertia can be used instead of a jaw clutch. For example, the clutch disclosed in my copending application, Serial No. 413,057, filed September 27, 1920, which has matured into Patent No. 1,453,202, granted April 24, 1923, might be substituted for the jaw clutches illustrated, the trip-off mechanism shown in Figs. 1 and 2 being particularly adapted for actuating a clutch of this character.

What I claim as new and desire to secure by Letters Patent is:

1. In a variable speed transmission, in combination, speed change gearing and driving connections therefor including a releasable friction clutch and a releasable positive clutch having its driving member connected to the driven member of said friction clutch and its driven member connected to said gearing and means for effecting release of said positive clutch following release of said friction clutch, said means including means to be tripped to permit substantially instantaneous re-engagement of said positive clutch during resetting of said friction clutch.

2. In a variable speed transmission in combination, speed change gearing and driving connections therefor including a releasable friction clutch and a releasable jaw clutch having its driving member connected to the driven member of said friction clutch and its driven member connected to said gearing, a spring associated with said jaw clutch to oppose release thereof and means for effecting release of said jaw clutch following release of said friction clutch and for insuring substantially instantaneous re-engagement of the former clutch under the action of said spring prior to resetting of the latter clutch.

3. In a variable speed transmission in combination, speed change gearing and driving connections therefor including a releasable friction clutch and a releasable jaw clutch having its driving member connected to the driven member of said friction clutch and its driven member connected to said gearing, a spring associated with said jaw clutch to oppose release thereof, and means for effecting release of said jaw clutch following release of said friction clutch, said means including a releasable operating connection between said clutches adapted to be tripped to permit re-engagement of said jaw clutch under the action of said spring during resetting of said friction clutch.

In witness whereof, I have hereunto subscribed my name.

WM. CLIFFORD STEVENS.